United States Patent [19]
Oglesby et al.

[11] Patent Number: 5,938,035
[45] Date of Patent: Aug. 17, 1999

[54] CAR WASHING BUCKET AND ORGANIZER

[76] Inventors: Gerardi Oglesby; Lawrence O. Yates, both of 212 Channing St. Northeast, Washington, D.C. 20002

[21] Appl. No.: 09/130,681

[22] Filed: Aug. 6, 1998

[51] Int. Cl.⁶ .................................................. B65D 71/00
[52] U.S. Cl. .............................. 206/576; 206/577; 220/8; 224/901
[58] Field of Search ..................................... 206/349, 361, 206/362, 576, 577; 220/8, 23.83, 23.87; 224/484, 572, 901, 901.2

[56] References Cited

U.S. PATENT DOCUMENTS

| | | | |
|---|---|---|---|
| 3,893,607 | 7/1975 | Jones | 206/576 |
| 5,332,098 | 7/1994 | Fisher | 206/576 |

*Primary Examiner*—Jacob K. Ackun

[57] ABSTRACT

A new car washing bucket and organizer for assisting in washing a car and storing loose belongings. The inventive device includes an outer container having an open upper end, a closed lower end, and a surrounding side wall. The outer container has a handle pivotally coupled thereto. An interior surface of the outer container has a pair of opposed protrusions extending inwardly therefrom. An inner container slidably receives within the open upper end of the outer container. The inner container has an open upper end, a closed lower end, and a surrounding side wall. The inner container has a pair of inverted U-shaped channel members disposed on exterior surfaces of side walls thereof. The channel members receive the protrusions of the outer container therein when the inner container is positioned within the outer container.

7 Claims, 3 Drawing Sheets

CAR WASHING BUCKET AND ORGANIZER

BACKGROUND OF THE INVENTION

1. Field of the Invention

The present invention relates to trunk organizers and more particularly pertains to a new car washing bucket and organizer for assisting in washing a car and storing loose belongings.

2. Description of the Prior Art

The use of trunk organizers is known in the prior art. More specifically, trunk organizers heretofore devised and utilized are known to consist basically of familiar, expected and obvious structural configurations, notwithstanding the myriad of designs encompassed by the crowded prior art which have been developed for the fulfillment of countless objectives and requirements.

Known prior art trunk organizers include U.S. Pat. No. 4,754,883 to Grzywa; U.S. Pat. No. 4,892,221 to Gora et al.; U.S. Pat. No. Des. 342,609 to Brightbill; U.S. Pat. No. 4,838,745 to Haydock; U.S. Pat. No. 5,437,369 to Spiere; and U.S. Pat. No. Des. 295,094 to Tapdrup.

While these devices fulfill their respective, particular objectives and requirements, the aforementioned patents do not disclose a new car washing bucket and organizer. The inventive device includes an outer container having an open upper end, a closed lower end, and a surrounding side wall. The outer container has a handle pivotally coupled thereto. An interior surface of the outer container has a pair of opposed protrusions extending inwardly therefrom. An inner container slidably receives within the open upper end of the outer container. The inner container has an open upper end, a closed lower end, and a surrounding side wall. The inner container has a pair of inverted U-shaped channel members disposed on exterior surfaces of side walls thereof. The channel members receive the protrusions of the outer container therein when the inner container is positioned within the outer container.

In these respects, the car washing bucket and organizer according to the present invention substantially departs from the conventional concepts and designs of the prior art, and in so doing provides an apparatus primarily developed for the purpose of assisting in washing a car and storing loose belongings.

SUMMARY OF THE INVENTION

In view of the foregoing disadvantages inherent in the known types of trunk organizers now present in the prior art, the present invention provides a new car washing bucket and organizer construction wherein the same can be utilized for assisting in washing a car and storing loose belongings.

The general purpose of the present invention, which will be described subsequently in greater detail, is to provide a new car washing bucket and organizer apparatus and method which has many of the advantages of the trunk organizers mentioned heretofore and many novel features that result in a new car washing bucket and organizer which is not anticipated, rendered obvious, suggested, or even implied by any of the prior art trunk organizers, either alone or in any combination thereof.

To attain this, the present invention generally comprises an outer container having an open upper end, a closed lower end, and a surrounding side wall. The outer container has a handle pivotally coupled thereto. A pair of outwardly extend tabs disposed on a front wall of the outer container for the handle to rest upon in a lowered orientation. An interior surface of the outer container has a pair of opposed protrusions extending inwardly therefrom. An inner container slidably receives within the open upper end of the outer container. The inner container has an open upper end, a closed lower end, and a surrounding side wall. The inner container has a pair of inverted U-shaped channel members disposed on exterior surfaces of side walls thereof. The channel members receive the protrusions of the outer container therein when the inner container is positioned within the outer container. Opposed edges of the open upper end of the inner container have tabs extending inwardly therefrom to facilitate removal of the inner container from the outer container. A perforated lid couples with the open upper end of the outer container. A harness receives the outer container therein. The harness includes an upper strap member extending around the surrounding side wall of the outer container. The upper strap member has a pair of crossing bottom strap members extending under the closed lower end of the outer container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new car washing bucket and organizer apparatus and method which has many of the advantages of the trunk organizers mentioned heretofore and many novel features that result in a new car washing bucket and organizer which is not anticipated, rendered obvious, suggested, or even implied by any of the prior art trunk organizers, either alone or in any combination thereof.

It is another object of the present invention to provide a new car washing bucket and organizer which may be easily and efficiently manufactured and marketed.

It is a further object of the present invention to provide a new car washing bucket and organizer which is of a durable and reliable construction.

An even further object of the present invention is to provide a new car washing bucket and organizer which is susceptible of a low cost of manufacture with regard to both materials and labor, and which accordingly is then susceptible of low prices of sale to the consuming public, thereby making such car washing bucket and organizer economically available to the buying public.

Still yet another object of the present invention is to provide a new car washing bucket and organizer which provides in the apparatuses and methods of the prior art some of the advantages thereof, while simultaneously overcoming some of the disadvantages normally associated therewith.

Still another object of the present invention is to provide a new car washing bucket and organizer for assisting in washing a car and storing loose belongings.

Yet another object of the present invention is to provide a new car washing bucket and organizer which includes an outer container having an open upper end, a closed lower end, and a surrounding side wall. The outer container has a handle pivotally coupled thereto. An interior surface of the outer container has a pair of opposed protrusions extending inwardly therefrom. An inner container slidably receives within the open upper end of the outer container. The inner container has an open upper end, a closed lower end, and a surrounding side wall. The inner container has a pair of inverted U-shaped channel members disposed on exterior surfaces of side walls thereof. The channel members receive the protrusions of the outer container therein when the inner container is positioned within the outer container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
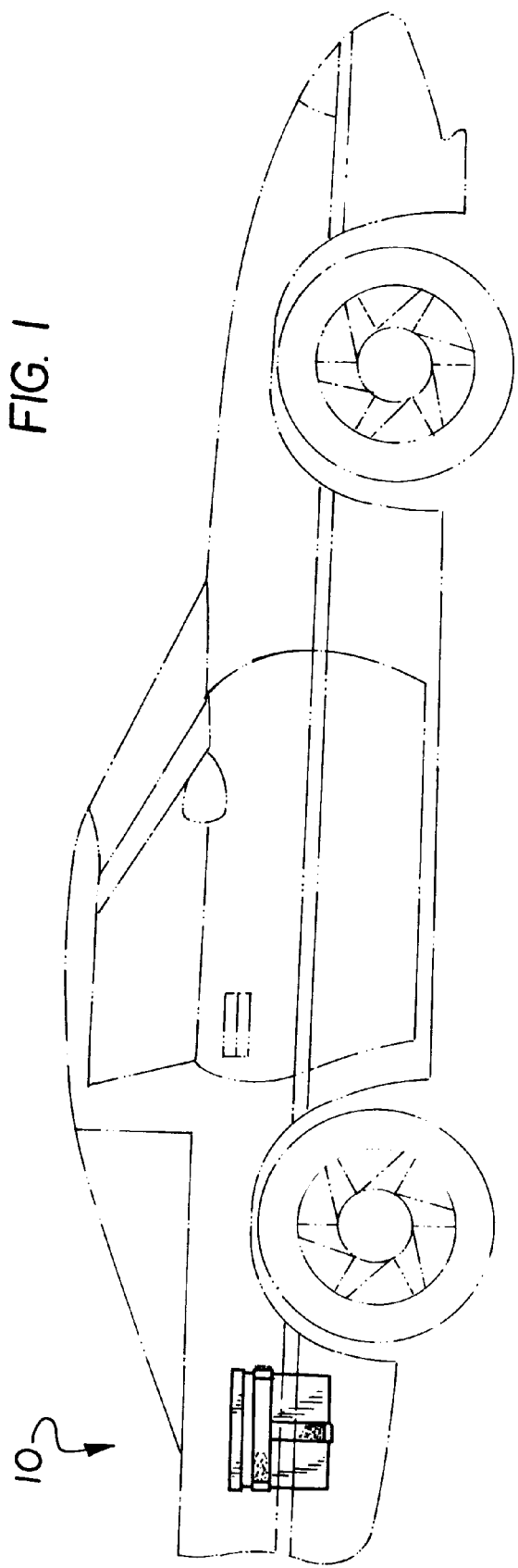
FIG. 1 is a side view of a new car washing bucket and organizer according to the present invention illustrated within a trunk of a vehicle.
Figure 2:
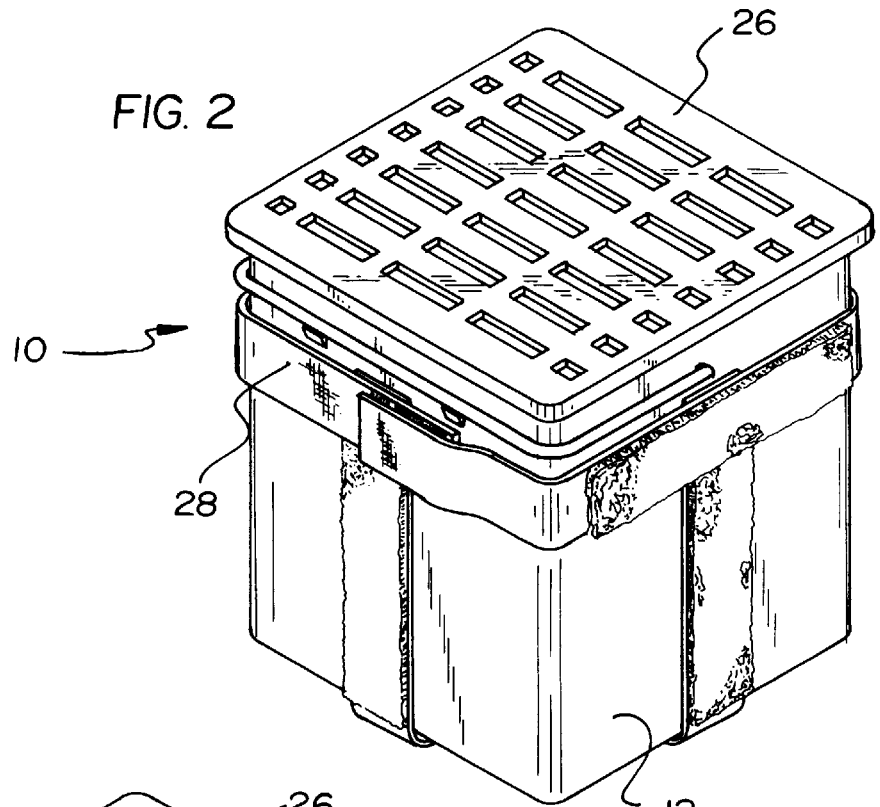
FIG. 2 is a perspective view of the present invention.
Figure 3:
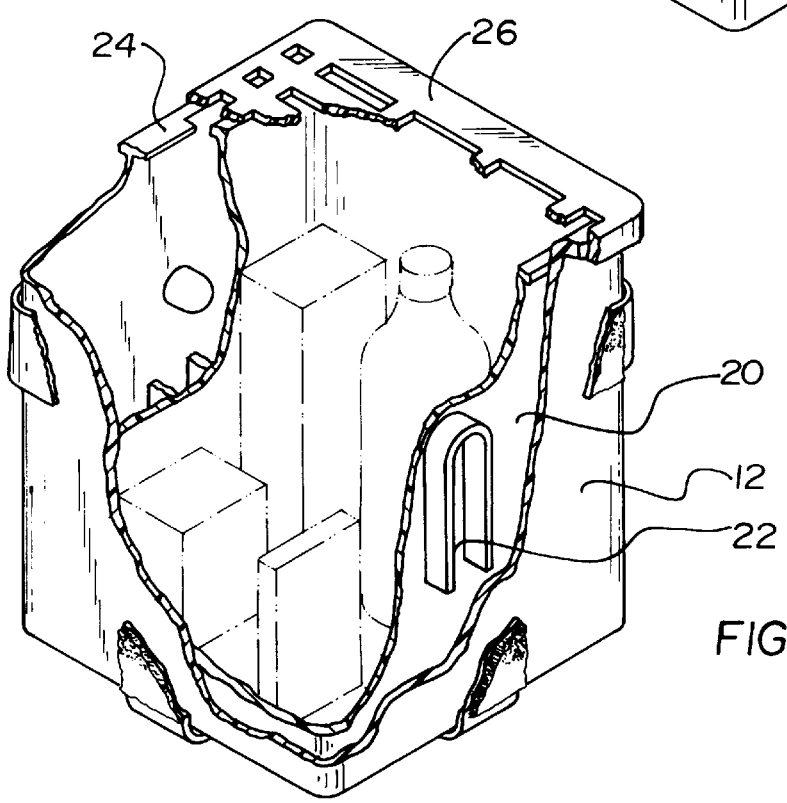
FIG. 3 is a perspective view of the present invention illustrating an interior thereof.
Figure 4:
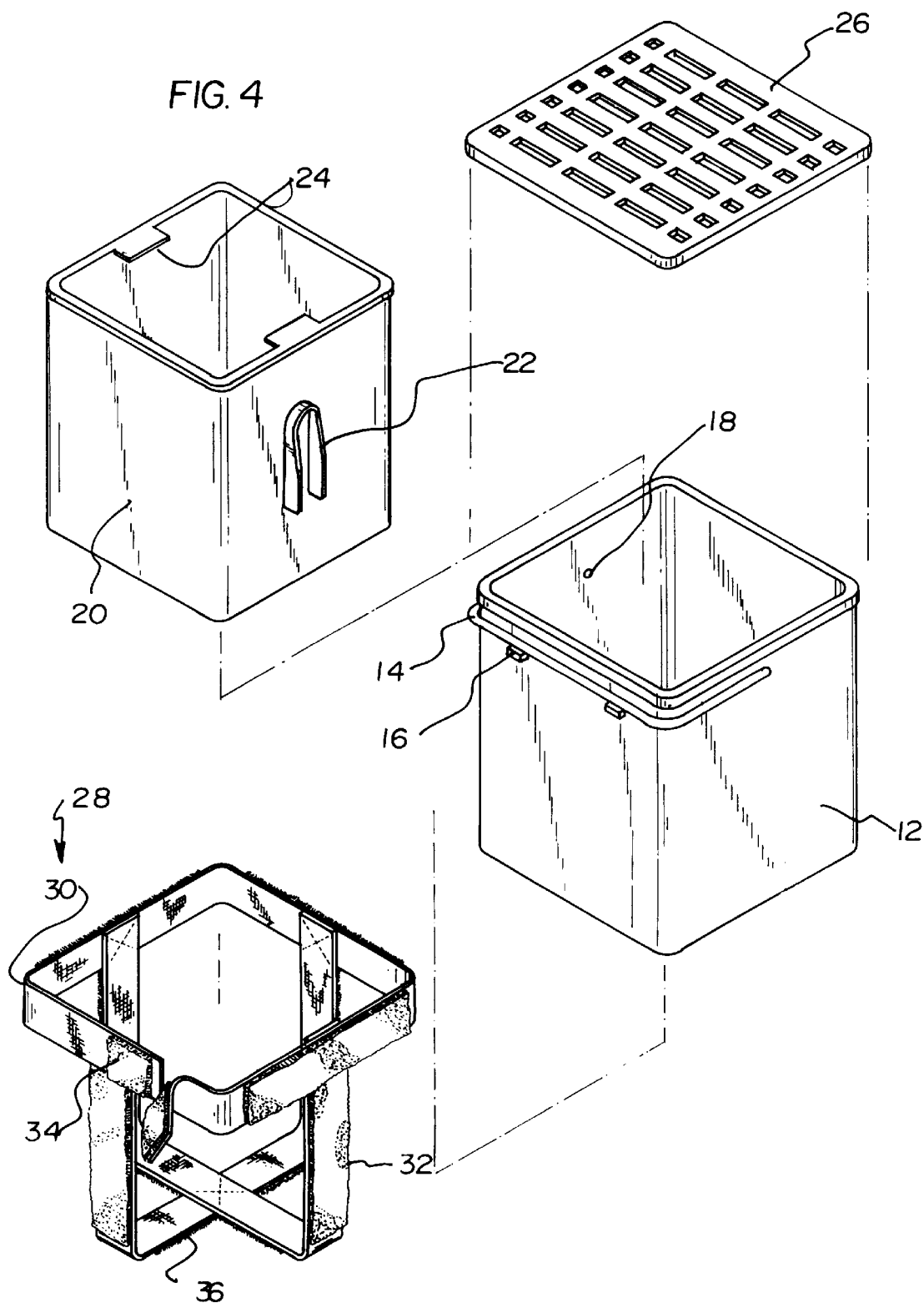
FIG. 4 is an exploded perspective view of the present invention.

With reference now to the drawings, and in particular to FIGS. 1 through 4 thereof, a new car washing bucket and organizer embodying the principles and concepts of the present invention and generally designated by the reference numeral 10 will be described.

As best illustrated in FIGS. 1 through 4, the car washing bucket and organizer 10 comprises an outer container 12 having an open upper end, a closed lower end, and a surrounding side wall. The outer container 12 has a handle 14 pivotally coupled thereto. A pair of outwardly extend tabs 16 disposed on a front wall of the outer container 12 for the handle 14 to rest upon in a lowered orientation. An interior surface of the outer container 12 has a pair of opposed protrusions 18 extending inwardly therefrom.

An inner container 20 slidably receives within the open upper end of the outer container 12. The inner container 20 has an open upper end, a closed lower end, and a surrounding side wall. The inner container 20 has a pair of inverted U-shaped channel members 22 disposed on exterior surfaces of side walls thereof. The channel members 22 receive the protrusions 18 of the outer container 12 therein when the inner container 20 is positioned within the outer container 12. Opposed edges of the open upper end of the inner container 20 have tabs 24 extending inwardly therefrom to facilitate removal of the inner container 20 from the outer container 12.

A perforated lid 26 couples with the open upper end of the outer container 12.

A harness 28 receives the outer container 12 therein. The harness 28 includes an upper strap member 30 extending around the surrounding side wall of the outer container 12. The upper strap member 30 has a pair of crossing bottom strap members 32 extending under the closed lower end of the outer container 12. The harness 28 would include hook and loop patches 34 to provide for a snug fit. The bottom surfaces of the bottom strap members 32 could be provided with hook and loop patches 36 for mating with a carpeted interior of the vehicle trunk to prevent the device 10 from falling over.

In use, the present invention would serve as a water bucket for washing the car virtually anywhere. The present invention could also store and contain loose belongings, such as motor oil bottle and paper towels, so the trunk space remains neat and organized.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A new car washing bucket and organizer for assisting in washing a car and storing loose belongings comprising, in combination:

an outer container having an open upper end, a closed lower end, and a surrounding side wall, the outer container having a handle pivotally coupled thereto, a pair of outwardly extending tabs disposed on a front wall of the outer container for the handle to rest upon in a lowered orientation, an interior surface of the outer container having a pair of opposed protrusions extending inwardly therefrom;

an inner container slidably receiving within the open upper end of the outer container, the inner container having an open upper end, a closed lower end, and a surrounding side wall, the inner container having a pair of inverted U-shaped channel members disposed on exterior surfaces of side walls thereof, the channel members receiving the protrusions of the outer container therein when the inner container is positioned within the outer container, opposed edges of the open upper end of the inner container having tabs extending inwardly therefrom to facilitate removal of the inner container from the outer container;

a perforated lid coupling with the open upper end of the outer container;

a harness receiving the outer container therein, the harness including an upper strap member extending around the surrounding side wall of the outer container, the upper strap member having a pair of crossing bottom strap members extending under the closed lower end of the outer container.

2. A new car washing bucket and organizer for assisting in washing a car and storing loose belongings comprising, in combination:

an outer container having an open upper end, a closed lower end, and a surrounding side wall, the outer container having a handle pivotally coupled thereto, an interior surface of the outer container having a pair of opposed protrusions extending inwardly therefrom;

an inner container slidably receiving within the open upper end of the outer container, the inner container having an open upper end, a closed lower end, and a surrounding side wall, the inner container having a pair of inverted U-shaped channel members disposed on exterior surfaces of side walls thereof, the channel members receiving the protrusions of the outer container therein when the inner container is positioned within the outer container.

3. The car washing bucket and organizer as set forth in claim 2 wherein a pair of outwardly extending tabs disposed on a front wall of the outer container for the handle to rest upon in a lowered orientation.

4. The car washing bucket and organizer as set forth in claim 2 wherein opposed edges of the open upper end of the inner container having tabs extending inwardly therefrom to facilitate removal of the inner container from the outer container.

5. The car washing bucket and organizer as set forth in claim 2 and further including a perforated lid coupling with the open upper end of the outer container.

6. The car washing bucket and organizer as set forth in claim 2 and further including a harness receiving the outer container therein.

7. The car washing bucket and organizer as set forth in claim 6 wherein the harness includes an upper strap member extending around the surrounding side wall of the outer container, the upper strap member having a pair of crossing bottom strap members extending under the closed lower end of the outer container.

* * * * *